(12) United States Patent
Hanna

(10) Patent No.: US 8,313,655 B2
(45) Date of Patent: Nov. 20, 2012

(54) WATER REACTION TANK

(75) Inventor: Jerry Hanna, Sherwood Park (CA)

(73) Assignee: Clearflow Enviro Systems Group Inc., Alberta (CA)

( * ) Notice: Subject to any disclaimer, the term of this patent is extended or adjusted under 35 U.S.C. 154(b) by 0 days.

(21) Appl. No.: 13/302,309

(22) Filed: Nov. 22, 2011

(65) Prior Publication Data

US 2012/0061327 A1 Mar. 15, 2012

Related U.S. Application Data

(62) Division of application No. 12/237,653, filed on Sep. 25, 2008, now Pat. No. 8,062,518.

(30) Foreign Application Priority Data

Jun. 9, 2008 (CA) ...................................... 2634672

(51) Int. Cl.
*C02F 1/52* (2006.01)
(52) U.S. Cl. ......... 210/738; 210/726; 210/205; 210/206
(58) Field of Classification Search .................. 210/738, 210/198.1, 205
See application file for complete search history.

(56) References Cited

U.S. PATENT DOCUMENTS

| | | | |
|---|---|---|---|
| 2,126,151 A | 8/1938 | Stutson | |
| 3,245,970 A | 4/1966 | Drayer | |
| 3,377,274 A | 4/1968 | Burke et al. | |
| 3,839,202 A | 10/1974 | Roy | |
| 3,918,688 A | 11/1975 | Huber et al. | |
| 4,457,842 A | 7/1984 | Bereiter | |
| 5,124,035 A | 6/1992 | Dunne et al. | |
| 5,248,416 A | 9/1993 | Howard, Jr. | |
| 5,269,940 A | 12/1993 | Kawamura et al. | |
| 5,611,921 A | 3/1997 | Deskins | |
| 6,749,748 B1 | 6/2004 | Macpherson et al. | |
| 7,235,175 B2 | 6/2007 | Brisset | |
| 2007/0175804 A1 | 8/2007 | Kosanda et al. | |
| 2009/0301973 A1 | 12/2009 | Hanna | |

FOREIGN PATENT DOCUMENTS

| | | |
|---|---|---|
| GB | 1346596 | 2/1974 |
| IL | 195609 | 9/2009 |

*Primary Examiner* — Tony G Soohoo
*Assistant Examiner* — Peter Keyworth
(74) *Attorney, Agent, or Firm* — Davis & Bujold PLLC

(57) ABSTRACT

A water reaction tank for reacting water containing suspended solids with a flocculant includes a housing having an input, an output, and a water flow path between the input and the output. The flow path has a mixing section and a reaction section. Sealable flocculant ports are provided for inserting a flocculant into the mixing section of the housing. Each of the mixing section and the reaction section contains baffles. The mixing section baffles encourage turbulent flow to increase contact with the flocculant, and the reaction section baffles encourage turbulent flow and increase the length of the water flow path.

11 Claims, 4 Drawing Sheets

WATER REACTION TANK

FIELD

A tank used to react water with a flocculant to clarify the water.

BACKGROUND

Regulations require that water from construction or other sites must be cleaned to a certain degree before being returned to the environment. Flocculants may be used to cause suspended fine particles to settle out of the water.

SUMMARY

There is provided a water reaction tank for reacting water containing suspended solids with a flocculant. The water reaction tank comprises a housing having an input, an output, and a water flow path between the input and the output. The flow path has a mixing section and a reaction section. Sealable flocculant ports are provided for inserting a flocculant into the mixing section of the housing. Each of the mixing section and the reaction section contains baffles. The mixing section baffles encourage turbulent flow to increase contact with the flocculant, and the reaction section baffles encourage turbulent flow and increase the length of the water flow path.

According to another aspect, there is provided a method of reacting water having suspended solids with a flocculant. A reaction tank is provided, comprising a housing having an input, an output, and a water flow path between the input and the output, the flow path having a mixing section and a reaction section, sealable flocculant ports for inserting a flocculant into the mixing section of the housing, where each of the mixing section and the reaction section containing baffles, the mixing section baffles encouraging turbulent flow to increase contact with the flocculant, the reaction section baffles encouraging turbulent flow and increasing the length of the water flow path. Flocculant is inserted into the mixing section through the sealable flocculant ports. Water is pumped into the reaction tank at a rate such that the turbulent flow caused by the baffles allows the flocculant to react with the suspended solids in the reaction section, and such that the water exits the output of the housing prior to the flocculated solids substantially settling from the water.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 1:
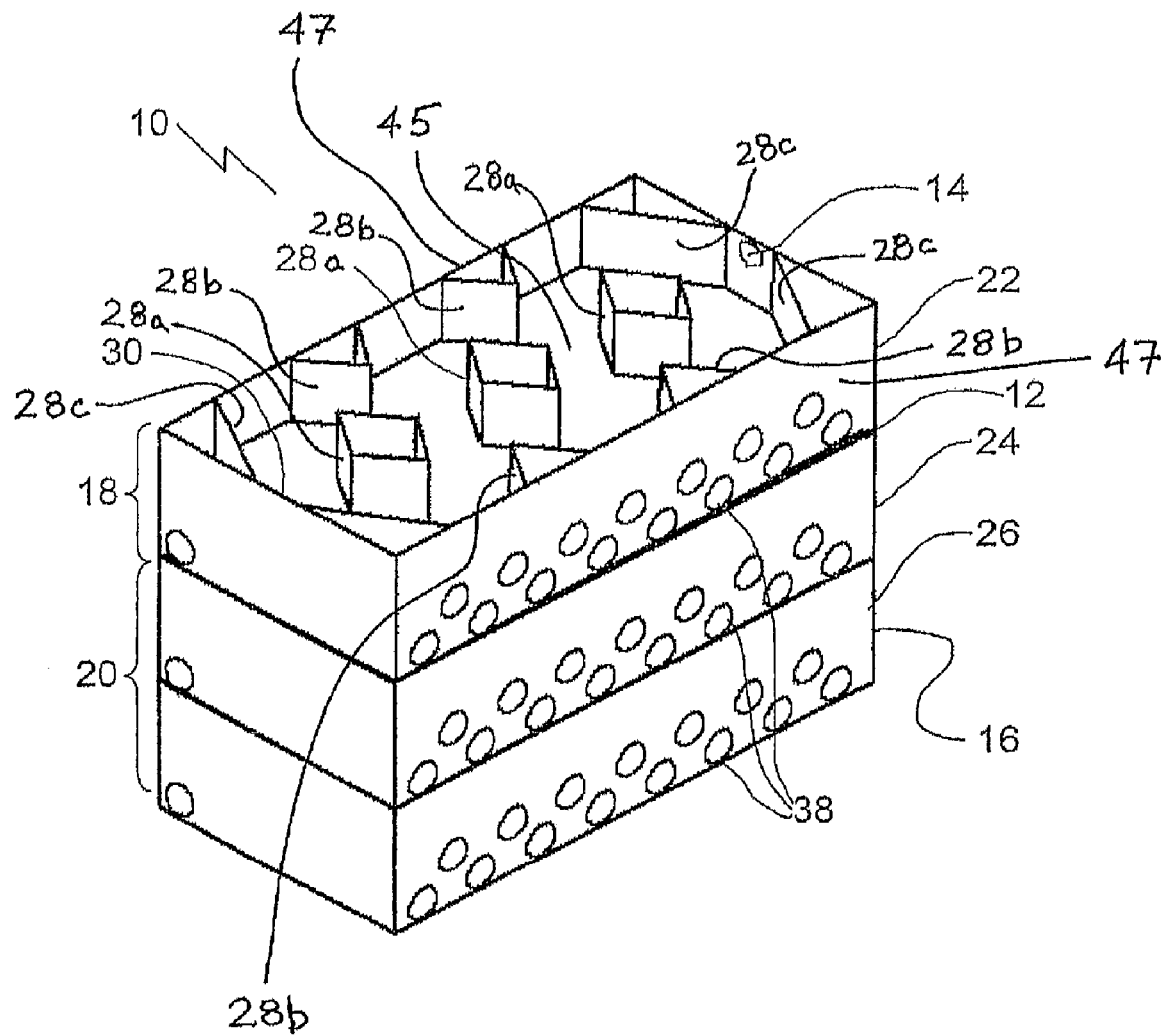
FIG. 1 is a perspective view of a water reaction tank.

A water reaction tank generally identified by reference numeral 10 will now be described with reference to FIGS. 1 through 7.

Figure 2:
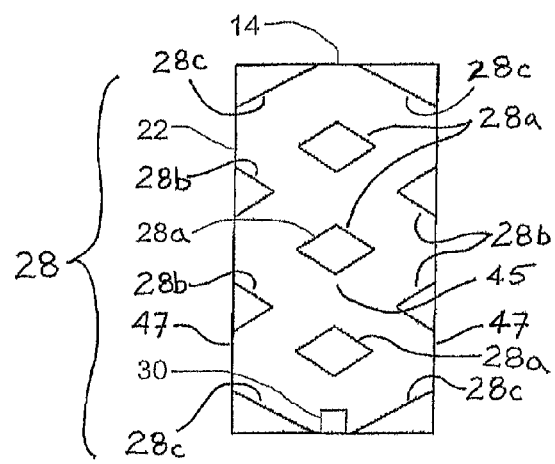
FIG. 2 is a top plan view of an upper level of the water reaction tank.
Figure 3:
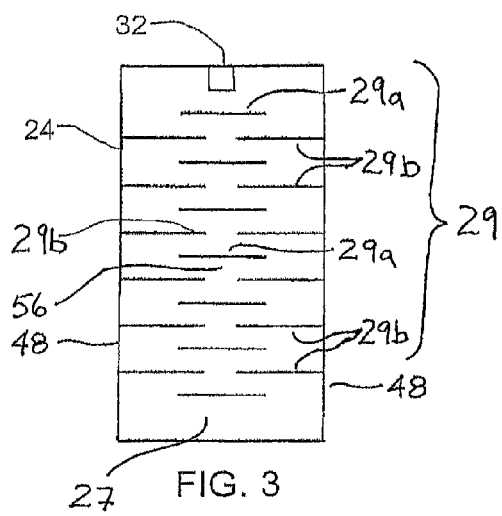
FIG. 3 is a top plan view of an intermediate level of the water reaction tank.
Figure 4:
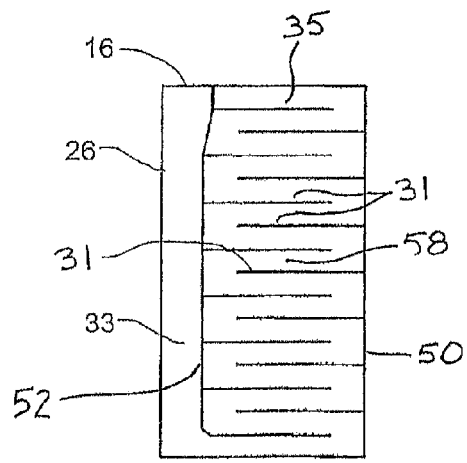
FIG. 4 is a top plan view of a lower level of the water reaction tank.

Structure and Relationship of Parts:

Water reaction tank 10 is used to clarify water containing suspended solids by reacting the suspended solids with a flocculant. Referring to FIG. 1, water reaction tank 10 includes a housing 12 having an input 14, an output 16, and a water flow path between input 14 and output 16. The flow path has a mixing section 18 and a reaction section 20. As shown in FIG. 1, the different sections are made up of levels in tank 10. Mixing section 18 is made up of upper level 22 and reaction section 20 is made up of intermediate level 24 and lower level 26 within housing 12. Each level many may have a sloped floor to cause the water to flow from the input to the output. These different levels are shown in FIGS. 2, 3 and 4. Referring to FIG. 2, flocculant, either as a solid block, or in a porous container, is positioned strategically among baffles 28 disposed in upper level 22. In some embodiments, baffles 28 can comprise a plurality of first baffles 28a disposed substantially in a spaced-apart configuration in central portion 45 of upper level 22, and a plurality of second baffles 28b disposed substantially in a spaced-apart configuration along one or both of sidewalls 47 extending inwardly towards central portion 45. In some embodiments, baffles 28 can further comprise a third baffle 28c disposed in one or more corners of upper level 22. An attachment (not shown) is provided to ensure the flocculant remains in the desired location. Baffles 28 direct the water toward the flocculant and encourage turbulent flow to increase contact between water and flocculant, and to distribute the flocculant throughout the water. In mixing section 18, flocculant and water are mixed, and is disposed above the reaction section within housing 12. In some embodiments, the input to this section is input 14 of housing 12, and the output 30 is a flow port, or hole, in the bottom of level 22 that causes the water to fall into receiving area 27 of intermediate level 24 Intermediate level 24 is shown in FIG. 3, and in some embodiments includes baffles 29 that increase the length of the water flow path, and encourage turbulent flow as water flows toward output 32 of intermediate level 24, and into receiving area 35 of bottom level 26. In some embodiments, baffles 29 can comprise a plurality of first reaction baffles 29a disposed substantially in a spaced-apart configuration in central portion 56 of intermediate level 24, and a plurality of second reaction baffles 29b disposed substantially in a spaced-apart configuration along one or both of sidewalls 48 extending inwardly towards central portion 56. In some embodiments, baffles 29 can provide two substantially parallel paths for the water flow path between receiving area 27 and output 32. In some embodiments, bottom level 26 also has baffles 31 that increase the flow path and encourage turbulent flow. In some embodiments, baffles 31 can extend inwardly, in a substantially spaced-apart configuration, from sidewall 50 and from internal wall 52 towards central portion 58 of lower level 26 wherein a single path can be provided for the water flow path from receiving area 35 to outlet 16. Bottom level 26 also has a channel 33 for directing the water toward output 16 of housing 12. The length of the flow path through housing 12 is designed to allow the flocculant to have sufficient turbulence and time to react with the suspended solids, but is short enough that the water is output before a significant amount of solids settle out from the water.

Figure 5:
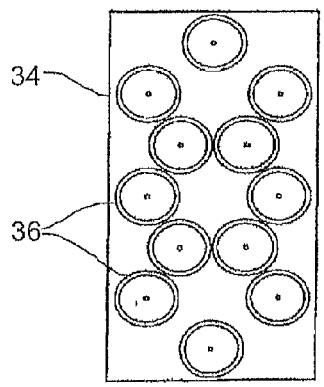
FIG. 5 is a top plan view of a top plate of the water reaction tank.
Figure 6:
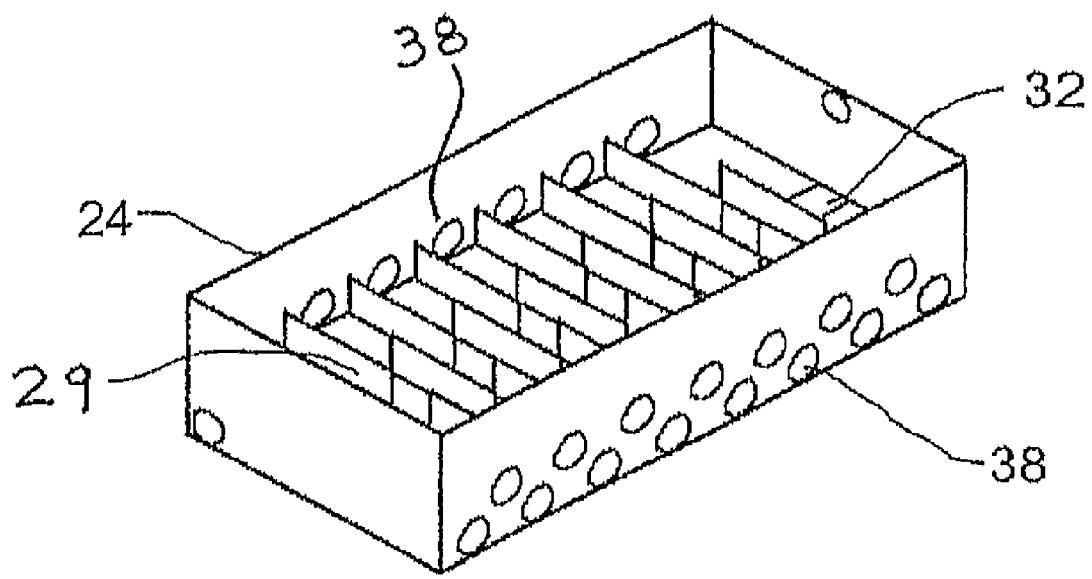
FIG. 6 is a perspective view of the intermediate level of the water reaction tank.
Figure 7:
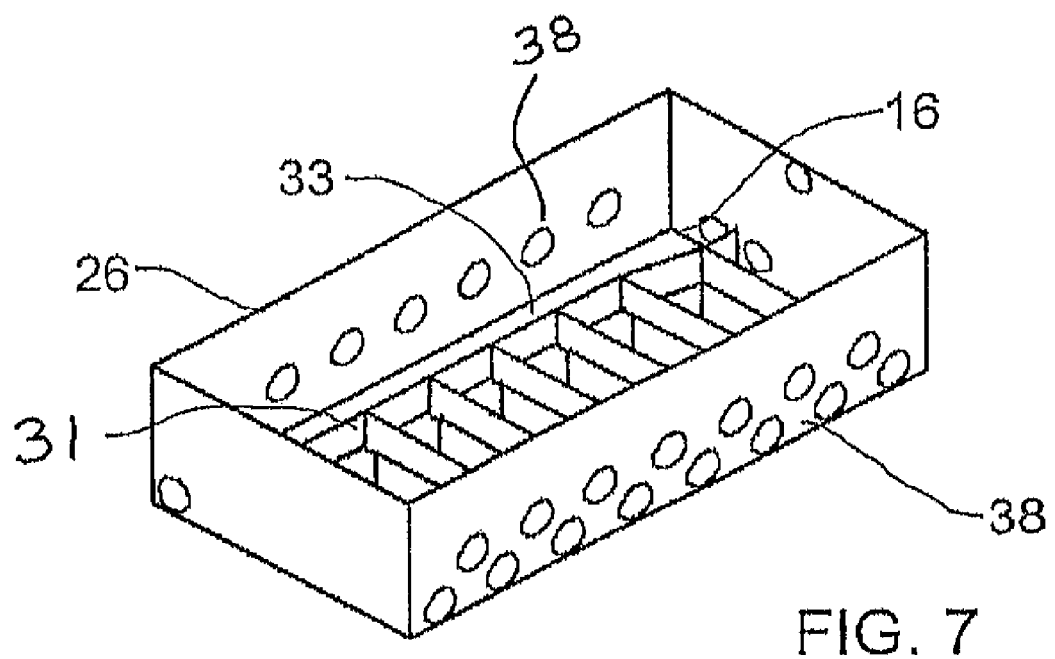
FIG. 7 is a perspective view of the lower level of the water reaction tank.

While not shown in FIG. 1, housing 12 is intended to be a sealed unit with a top plate 34 shown in FIG. 5. Top plate 34 has flocculant ports 36 for inserting a flocculant into the mixing section, or upper level 22, of housing 12. By comparing FIG. 2 with FIG. 5, it can be seen that, preferably, the flocculant is inserted in the spaces between baffles 28. Flocculant ports 36 are sealable, such that, once the flocculant has been inserted, housing 12 may be properly sealed to prevent any leakage.

Referring to FIG, 1, 6 and 7, housing 12 also includes sealable flushing ports 38 disposed on opposing sidewalls of housing 12 for permitting cleaning fluids to be flushed through housing 12 when opened to remove any debris or solids in the housing. Each level has a set of flushing ports 38. Flushing ports are positioned on the side of each level 22, 24, 26 such that cleaning fluid flows perpendicular to the flow path direction, such that the cleaning fluids are not significantly impeded by baffles 28, 29 or 31.

Operation:

Referring to FIG. 1 through 7, water reaction tank 10 is provided as described above. Water reaction tank 10 is prepared for use by positioning body 12 in a desired location, and levelling the housing 12. Flocculant is inserted into upper level 22 of housing 12 through flocculant ports 36, shown in FIG. 5. These ports are then sealed. Referring to FIG. 1, once tank 10 is properly set up, water with suspended solids is pumped into water reaction tank 10 through input 14. This is preferably done at a controlled rate in order to allow sufficient time within tank 10 to allow the flocculant to react with the suspended solids, but short enough that not much of the solids fall out. Referring to FIG. 2, as the water is pumped into upper level 22, water is diverted by baffles 28 to contact the flocculant, and to create a turbulent flow. The water then flows through output 30 and into intermediate level 24 shown in FIG. 3 where baffles 29 create turbulent flow, and increase the flow path of the water. The water then flows through output 32 and into lower level 26 shown in FIG. 4 where baffles 31 continue to create turbulent flow and increase the flow path of the water. The water then travels along channel 33 and exits at output 16.

Figure 8:
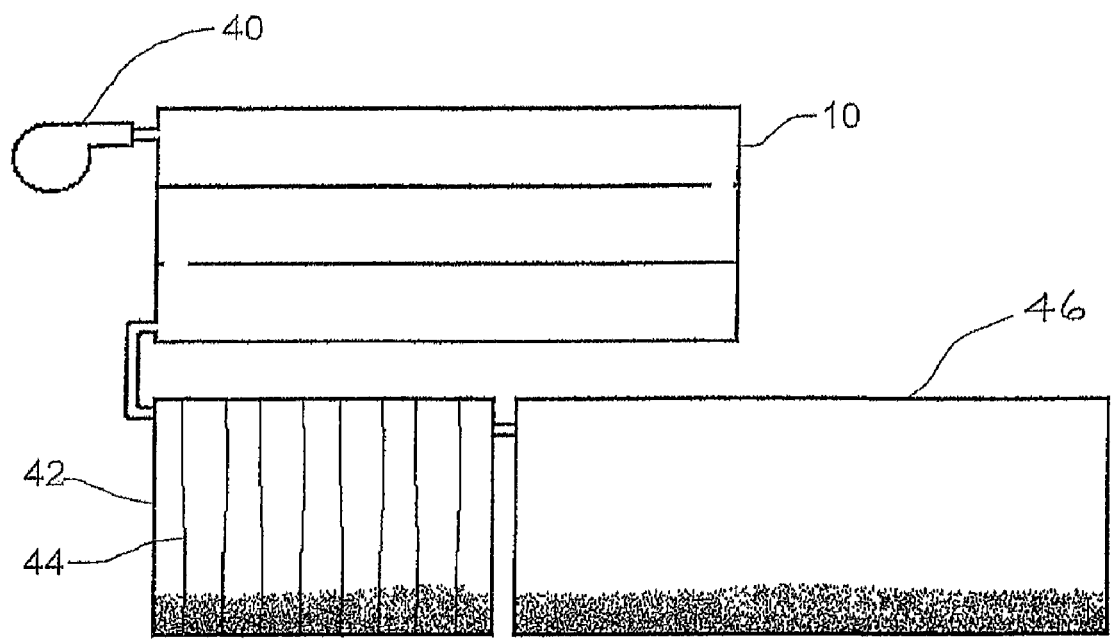
FIG. 8 is a schematic view of a water clarifying system.

Water reaction tank 10 is intended to be part of a system for cleaning water. A preferred system is shown in FIG. 8, where pump 40 pumps water into tank 10, and water that exits tank 10 is carried into a filter tank 42 with porous baffles 44, such as burlap, that encourage the flocculated solids to fall out of the water. The water is then carried into a settling tank 46. Clarified water may then be pumped off the top and disposed of In situations where there is limited space, the various tanks and components may be stacked in various configurations to reduce the overall footprint.

Figure 9:
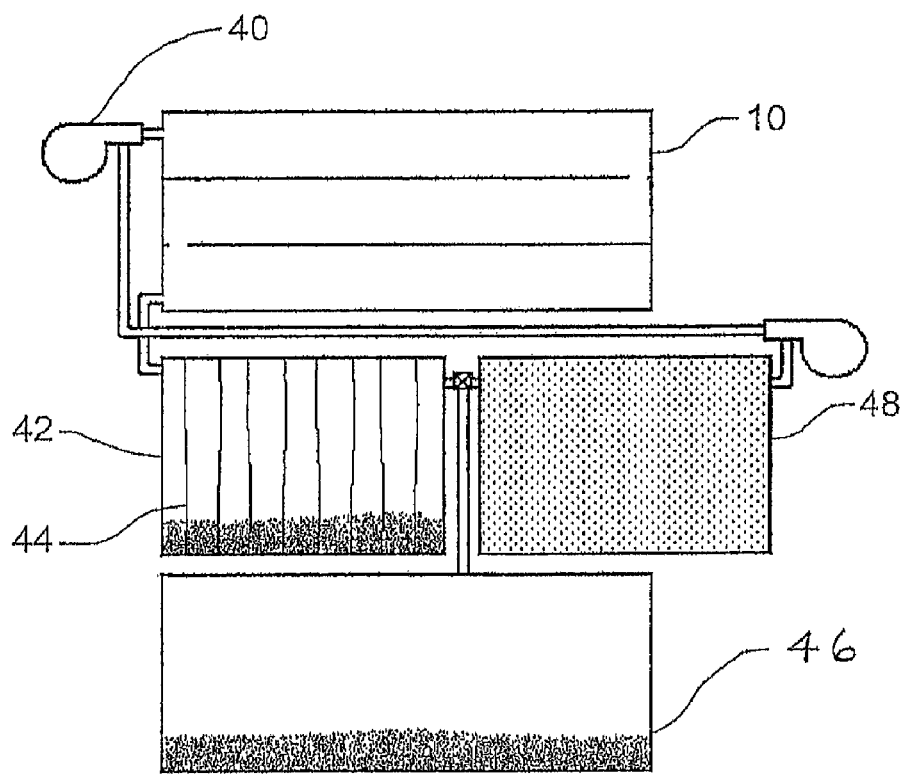
FIG. 9 is a schematic view of an alternate water clarifying system.

Alternatively, referring to FIG. 9, a resuspension tank 48 may be included to further clean the water, such as to reduce the total dissolved solid content in the water. Resuspension tank 48 mixes the water with, for example, clay, to increase the turbidity of the water. The water may then be recirculated through water reaction tank 10 as shown, or through a second water reaction tank, not shown. The clay particles are then flocculated out in an attempt to access more of the dissolved solids in the water. While resuspension tank 48 is depicted as being located between filter tank 42 and settling tank 46, it will be understood that it could be located anywhere in the process after water reaction tank 10, depending on the preferences of the user.

Referring again to FIG. 1, once operations have ceased, water reaction tank 10 is cleaned by opening flushing ports 38, and flushing housing 12 with fluid, either water, or a cleaning solution if necessary.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The following claims are to be understood to include what is specifically illustrated and described above, what is conceptually equivalent, and what can be obviously substituted. Those skilled in the art will appreciate that various adaptations and modifications of the described embodiments can be configured without departing from the scope of the claims. The illustrated embodiments have been set forth only as examples and should not be taken as limiting the invention. It is to be understood that, within the scope of the following claims, the invention may be practiced other than as specifically illustrated and described.

What is claimed is:

1. A method of reacting water having suspended solids with a flocculant, comprising the steps of:
  a) providing a reaction tank comprising:
    i) a housing having an input, an output, and a water flow path disposed between the input and the output, the flow path passing through a mixing section and a reaction section, the mixing and reactions sections disposed in the housing and each section further comprising sidewalls, the mixing section disposed above the reaction section, the mixing section comprising the input and a first flow port configured for providing communication for the water flow path between the mixing section and the reaction section, the reaction section further comprising the outlet,
    ii a top plate disposed on top of the mixing section the top plate comprising flocculant ports for inserting the flocculant into the mixing section, and
    iii each of the mixing section and the reaction section containing baffles, the mixing section baffles comprising a plurality of first baffles disposed substantially in a spaced-apart configuration in a central portion of the mixing section and further comprising a plurality of second baffles disposed substantially in a spaced-apart configuration along at least one of the sidewalls of the mixing section extending inwardly towards the central portion of the mixing section, the mixing section configured to encourage turbulent flow to increase contact with the flocculant, the reaction section baffles encouraging turbulent flow and increasing the length of the water flow path;
  b) inserting the flocculant into the mixing section through the flocculant ports; and
  c) pumping water into the reaction tank at a rate such that the turbulent flow caused by the baffles allows the flocculant to react with the suspended solids in the reaction section, and such that the water exits the output of the housing prior to the flocculated solids substantially settling from the water.

2. The method of claim 1, wherein the flocculant ports are sealable.

3. The method of claim 1, wherein the reaction section comprises an intermediate reaction section level, a lower reaction section level and a second flow port configured for providing communication for the water flow path therebetween.

4. The method of claim 3, wherein the intermediate reaction section is stacked vertically on the lower reaction section level.

5. The method of claim 3, wherein the intermediate reaction section level comprises the reaction section baffles, the reaction section baffles disposed in the intermediate reaction section level further comprising a plurality of first reaction baffles disposed substantially in a spaced-apart configuration in a central portion of the intermediate reaction section level and further comprising a plurality of second reaction baffles disposed substantially in a spaced-apart configuration along the sidewalls of the intermediate reaction section level extending inwardly towards the central portion of the intermediate reaction section level, the first and second reaction baffles configured to provide two substantially parallel paths for the water flow path through the intermediate reaction section level.

6. The method of claim 3, wherein the lower reaction section level comprises the reaction section baffles, the reaction section baffles disposed in the lower reaction section level further comprising a plurality of third reaction baffles disposed, in a substantially spaced-apart configuration, on a sidewall of the lower reaction section level and on an internal wall disposed in the lower reaction section level, the third reaction baffles extending inwardly towards a central portion of the lower reaction section level, the third reaction baffles configured to provide a single path for the water flow path through the lower reaction section level.

7. The method of claim 1, wherein the reaction tank further comprises sealable flushing ports disposed on opposing sidewalls of the housing for permitting cleaning fluids to be flushed through the housing from one of the opposing sidewalls to the other of the opposing sidewalls when the flushing ports are opened to remove any debris or solids in the tank.

8. The method of claim 7, wherein the flushing ports permit the cleaning fluids to be flushed through the housing perpendicular to the flow path direction such that the cleaning fluids are not significantly impeded by the baffles.

9. The method of claim 1, wherein the housing further comprises an attachment for securing a solid block of flocculant or the flocculant in a porous container within the mixing section.

10. The method of claim 1, wherein the mixing section comprises a bottom configured to enclose the reaction section.

11. The method of claim 1, wherein the mixing section baffles further comprise a third deflecting baffle disposed in one or more corners of the mixing section.

* * * * *